(12) United States Patent
Flanders et al.

(10) Patent No.: US 6,525,880 B2
(45) Date of Patent: Feb. 25, 2003

(54) INTEGRATED TUNABLE FABRY-PEROT FILTER AND METHOD OF MAKING SAME

(75) Inventors: Dale C. Flanders, Lexington, MA (US); Peter S. Whitney, Lexington, MA (US); Minh Van Le, Methuen, MA (US); Michael F. Miller, Hollis, NH (US); Stanley R. Shanfield, Newton, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/797,529

(22) Filed: Mar. 1, 2001

(65) Prior Publication Data

US 2001/0028503 A1 Oct. 11, 2001

Related U.S. Application Data

(63) Continuation of application No. 09/645,200, filed on Aug. 25, 2000.
(60) Provisional application No. 60/186,780, filed on Mar. 3, 2000.

(51) Int. Cl.⁷ .............................................. G02B 27/00
(52) U.S. Cl. ....................... 359/578; 359/577; 359/900; 216/24
(58) Field of Search .......................... 356/454; 359/577, 359/578, 291, 846, 847, 900; 216/24

(56) References Cited

U.S. PATENT DOCUMENTS

| 4,825,262 A | * | 4/1989 | Mallinson | 356/454 |
| 4,859,060 A | | 8/1989 | Katagiri et al. | 356/352 |
| 5,022,745 A | | 6/1991 | Zayhowski et al. | 359/847 |
| 5,291,502 A | | 3/1994 | Pezeshki et al. | 372/20 |
| 5,430,574 A | | 7/1995 | Tehrani | 359/378 |
| 5,561,523 A | | 10/1996 | Blomberg et al. | 356/352 |
| 5,589,689 A | * | 12/1996 | Koskinen | 250/339.01 |
| 5,739,945 A | | 4/1998 | Tayebati | 359/291 |
| 5,835,216 A | | 11/1998 | Koskinen | 356/352 |
| 5,949,571 A | | 9/1999 | Goosen et al. | 359/291 |
| 6,078,395 A | | 6/2000 | Jourdain et al. | 356/352 |

FOREIGN PATENT DOCUMENTS

| EP | 0 667 548 | 4/1995 | C08K/5/10 |
| WO | 99/34484 | 7/1999 | G01B/9/02 |

OTHER PUBLICATIONS

D. Vakhshoori, et al., "2 mW CW singlemode operation of a tunable 1550 nm vertical cavity surface emitting laser with 50 nm tuning range", Electronics Letters, vol. 35, No. 11, May 27, 1999, pp. 1–2.*

Dehe, et al., "III–V Compound Semiconductor Micromachined Actuators for Long Resonator Tunable Fabry–Perot Detectors", Sensors and Actuators, (1998) 365–371.

(List continued on next page.)

*Primary Examiner*—John Juba, Jr.

(57) ABSTRACT

A tunable Fabry-Perot filter includes an optical cavity bounded by a stationary reflector and a deformable or movable membrane reflector. A second electrostatic cavity outside of the optical cavity includes a pair of electrodes, one of which is mechanically coupled to the movable membrane reflector. A voltage applied to the electrodes across the electrostatic cavity causes deflection of the membrane, thereby changing the length of the optical cavity and tuning the filter. The filter with the movable membrane can be formed by micro device photolithographic and fabrication processes from a semiconductor material in an integrated device structure. The membrane can include an inner movable membrane portion connected within an outer body portion by a pattern of tethers. The tether pattern can be such that straight or radial tethers connect the inner membrane with the outer body. Alternatively, a tether pattern with tethers arranged in a substantially spiral pattern can be used.

28 Claims, 17 Drawing Sheets

OTHER PUBLICATIONS

Aratani, K.; French, P.J.; Sarro, P.M.; Poenar, D.; Wolffenbuttel, R.F.; and Middlehoek, S. "Surface Micromachined Tuneable Interferometer Array," Sensors and Actuators A, 43 (1994) pp. 17–23.

Blomberg, Martti; Rusanen, Outi; Keranen, Kimmo; Lehto, Ari, "A Silicon Microsystem—Miniaturised Infraared Spectrometer," 1997 International Conference on Solid–State Sensors and Actuators, Chicago, Jun. 16–19, 1997.

Jerman, J.H., "The Fabrication and Use of Micromachined Corrugated Silicon Diaphragms," Sensors and Actuators, A21–A23 (1990), pp. 988–992.

Jerman, J.H; and Clift, D.J., "Miniature Fabry–Perot Interferometers Micromachined in Silicon for Use in Optical Fiber WDM Systems," 1991 IEEE. Transducers '91 Conf. pp 372–375.

Jerman, J.H.; Clift, D.J.; and Mallinson, S.R., "A Miniature Fabry–Perot Interferometer With a Corrugated Silicon Diaphragm Support," Sensors and Actuators A, 29 (1991) pp. 151–158.

Keränen, Kimmo; Karioja, Pentti; Rusanen, Outi; Tenhunen, Jussi; Blomberg, Martti; and Lehto, Ari, "Electrically Tuneable NIR–Spectrometer," SPIE vol. 3099, pp. 181–184. 1997.

Klemic, James F.; Sirota, J. Marcos; and Mehregany, Mehran, "Fabrication Issues in Micromachined Tunable Optical Filters," SPIE, vol. 2639, pp. 89–100. 1995.

Larson, M.C.; Pezeshki, B.; and Harris, J.S., Jr., "Vertical Coupled–Cavity Microinterferometer on GaAs with Deformable–Membrane Top Mirror," IEEE Photonics Technology Letters, vol. 7, No. 4, Apr. 1995.

Lissberger, P.H.; and Roy, A.K., "Narrowband Position–Tuned Multilayer Interference Filter For Use in Single–Mode–Fibre Systems." Electronics Letters, vol. 21, No. 18, pp 798–799. Aug. 1995.

Mallinson, S.R., "Crosstalk Limits of Fabry–Perot Demultiplexers," Electronics Letters, vol. 21, No. 17. Aug. 15, 1985, pp. 759–761.

Mallinson, S.R.; Jerman, J.H., "Miniature Micromachined Fabry–Perot Interferometers in Silicon," Electronics Letters, vol. 23, No. 20, Sep. 24, 1987 pp. 1041–1043.

Mallinson, Stephen R., "Wavelength–Selective Filters for Single–Mode Fiber WDM Systems Using Fabry–Perot Interferometers," Applied Optics, vol. 26, No. 3, Feb. 1, 1987, pp. 430–436.

Peerlings, J.; Dehé, A.; Vogt, A.; Tilsch, M.; Hebeler, C.; Langenhan, F.; Meissner, P.; and Hartnagel, H.L, "Long Resonator Micromachined Tunable GaAs–AlAs Fabry–Pérot Filter," IEEE Photonics Technology Letters, vol. 9, No. 9, Sep. 1997.

Rossberg, Dirk, "Optical Properties of the Integrated Infrared Sensor," Sensors and Actuators A 54 (1996), pp. 793–797.

Rossberg, D., "Silicon Micromachined Infrared Sensor With Tunable Wavelength Selectivity for Application in Infrared Spectroscopy," Sensors and Actuators A 46–47 (1995), pp. 413–416.

Stone, J.; and Stulz, L.W., "Pigtailed High–Finesse Tunable Fibre Fabry–Perot Interferometers with Large, Medium and Small Free Spectral Ranges," Electronics Letters, Jul. 16, 1987, vol. 23, No. 15.

Tayebati, P.; Wang, P.; Azimi, M; Maflah, L; and Vakhshoori, D., "Microelectromechanical Tunable Filter with Stable Half Symmetric Cavity," Electronics Letters, Oct. 1, 1998, vol. 34, No. 20.

Tayebati, P.; Wang, P.D.; Vakhshoori, D.; and Sacks, Robert N., "Widely Tunable Fabry–Perot Filter Using Ga(Al)As–A10$_x$ Deformable Mirrors," IEEE Photonics Technology Letters, vol. 10, No. 3, Mar. 1998.

Tran, A.; Christenson, G.L.; Lopez, A.; Lo, Y.H., "Micromachined Micro–Optic Devices," IEEE, LEOS Newsletter, Apr. 1996.

Tran, A.T.T.D.; Lo, Y.H.; Zhu, Z.H.; Haronian, D.; and Mozdy, E., "Surface Micromachined Fabry–Perot Tunable Filter," IEEE Photonics Technology Letters, vol. 8, No. 3, Mar. 1996, pp. 393–395.

Vail, E.C.; Wu, M.S.; Li, G.S.; Eng, L.; and Chang–Hasnain, C.J., "GaAs Micromachined Widely Tunable Fabry–Perot Filters," Electronics Letters, Feb. 2, 1995, vol. 31, No. 3.

Viitasalo, M.; Hohtola, M.; Blomberg, M.; Helenelund, Ch.; Torkkeli, A.; and Lehto, A.; Oy, Vaisala, "Carbon Dioxide Sensor Based on Micromachined Fabry–Perot Interferometer," Sensor 97 Kongreβband III, poster A7.36, pp. 193–198.

Walker, James A.; Goossen, Keith W.; Arney, Susanne C., "Fabrication of a Mechanical Antireflection Switch for Fiber–to–the–Home Systems," Journal of Microelectromechanical Systems, vol. 5, No. 1, Mar. 1996, pp. 45–51.

Wu, M.S.; Vail, E.C.; Li, G.S.; Yuen, W.; and Chang–Hasnain, C.J., "Widely and Continuously Tunable Micromachine Resonant Cavity Detector With Wavelength Tracking," IEEE Photonics Technology Letter, vol. 8, No. 1, Jan. 1996.

"Fabricating Small Apertures in Silicon–on–Insulator Wafers," Photonics Tech Briefs, Mar. 2000, p. 31a.

MEM–TUNE Tunable Filter, Preliminary Data Sheet DS00553, May 2000, CoreTek, Inc., 299 Ballardvale Street, Wilmington, MA 01887.

"Micromachined Opto/Electro/Mechanical Systems," NASA Tech Briefs, Mar. 1997, pp. 50–52, 111–112.

OPM–1 Optical Performance Monitor, Preliminary Data Sheet, DS00555, May 2000, CoreTek, Inc., 299 Ballardvale Street, Wilmington, MA 01887.

* cited by examiner

HEXAGON

PENTAGON

LOOP

THICK SPIRAL

THIN SPIRAL

INTEGRATED TUNABLE FABRY-PEROT FILTER AND METHOD OF MAKING SAME

RELATED APPLICATION

This application is a Continuation of U.S. application Ser. No. 09/645,200, filed on Aug. 25, 2000, and claims the benefit of the filing date of Provisional Application No. 60/186,780, filed Mar. 3, 2000, the entire teachings of both applications being incorporated herein by this reference.

BACKGROUND OF THE INVENTION

A Fabry-Perot filter (FPF) is an optical device which is constructed to pass light of a selected band of wavelengths. Light entering the filter enters a cavity which is bounded by a pair of reflective surfaces. The reflective surfaces are separated by a precisely controlled distance which determines a set of passbands for the filter. The smaller the separation, the further apart the passbands are in wavelength. That is, the smaller the separation, the larger the free spectral range (FSR) of the filter.

A tunable FPF adds an adjustable component to the separation by which the peak wavelengths of the passbands can be changed. Typically, tuning is achieved in a miniature FPF by making one of the two reflectors a movable or deformable membrane and applying a voltage between the membrane and the second fixed reflector, thereby changing the cavity separation distance through electrostatic attraction. In such a device, the amount of deflection and, therefore, cavity length control, is dependent upon the distance between the reflectors and the level of the applied voltage. For a given starting separation, more deflection requires a higher voltage level; and, likewise, for a given voltage range, more deflection requires that the reflectors be closer together.

At voltage levels compatible with smaller miniature devices, the prior approach to tuning FPFs restricts the device to a relatively small cavity size. This constraint can greatly inhibit the performance of the device by restricting control over the wavelength passbands.

SUMMARY OF THE INVENTION

In general according to one aspect, the invention features a tunable optical filter. This filter comprises a first mirror structure, a second, concave mirror structure, and a spacer layer separating the first mirror structure and the second mirror structure. Together, the first mirror structure and the second mirror structure define a resonant optical cavity of the optical filter. An electrostatic cavity, across which electric fields are generated, controls a separation between the first mirror structure and the second mirror structure to thereby change a length of the optical cavity.

In the present embodiment, the first mirror structure is substantially flat and disposed on a membrane that is deflected by the electric fields of the electrostatic cavity.

Preferably, the membrane is formed in a membrane layer that is patterned with an outer portion and tethers extending from the outward portion inward to the membrane.

In an alternative embodiment, the first mirror structure comprises a suspended HR coating layer that functions as a deflectable membrane layer. In such case, a metal electrode that has been deposited on the HR coating layer is useful.

In a current implementation, the resonant optical cavity is between 15 and 25 micrometers long.

In general, according to another aspect, the invention features a tunable optical filter. This filter comprises a support substrate, a membrane layer comprising a membrane structure on which a first mirror has been deposited, a release layer between the membrane layer and the support substrate, and a mirror structure that supports a second mirror that defines a filter cavity in combination with the first mirror. According to the invention, at least one of the first mirror and the second mirror is curved.

In the current embodiment, a spacer that separates the mirror structure from the membrane layer. And, the membrane layer is manufactured from silicon wafer material, with the release layer being silicon oxide. This release layer defines an electrostatic cavity between the membrane structure and the support substrate. An optical port is preferably provided through the support substrate to the membrane layer.

Optical coatings are important for high quality devices. Thus, an antireflective coating is preferably deposited on the membrane layer opposite the first mirror. Mirror structures manufactured from dielectric coatings are also desirable.

Various spacers can be used such as silicon or metal spacers. These are preferably assembled using solder.

In general according to another aspect, the invention features a method for fabricating a tunable filter. This method comprises selectively removing part of a release layer to create a membrane structure in a membrane layer, and then connecting a mirror structure to the membrane layer. Highly reflective (HR) coatings are deposited on the membrane layer and the mirror structure to provide a curved mirror/flat mirror optical cavity.

In one embodiment, an electrostatic cavity is provided across a void formed during the step of selectively removing the release layer.

In another embodiment, the electrostatic cavity is formed by covering the membrane layer with a sacrificial layer and then forming a patterned conductive material structure on the sacrificial layer, and then removing the sacrificial layer to create an air bridge cavity.

According to still another aspect, the invention features a method for fabricating a tunable filter. This method comprises depositing an membrane layer, including an HR coating on a support substrate, etching an opening through the support substrate to the membrane layer to create a deflectable membrane and connecting a curved mirror structure to membrane layer create an optical cavity.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
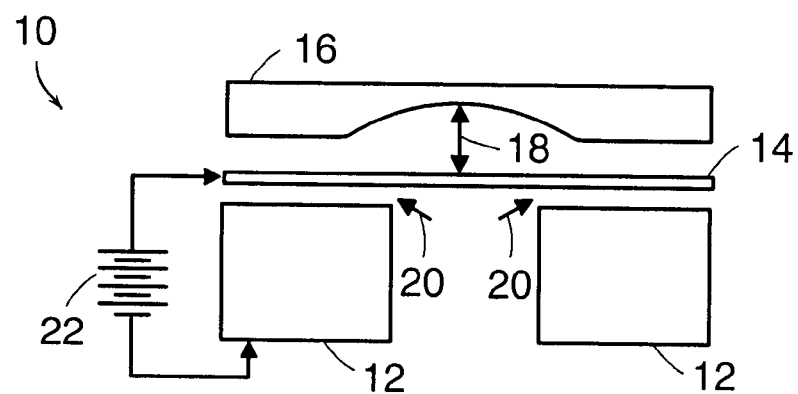
FIG. 1 contains a schematic cross-sectional diagram of one embodiment of an optical filter in accordance with the invention.

FIG. 1 contains a schematic cross-sectional view of one embodiment of a is tunable Fabry-Perot filter (FPF) 10 in accordance with the invention. The filter 10 includes three main functional layers, including a tuning drive electrode 12, a moving membrane reflector 14, and a concave, e.g., spherical, cavity reflector 16. These functional layers are held together and operated as a tunable FPF with several interstitial layers, as described hereinafter in detail.

The reflectors 16 and 14 define the optical cavity 18 of the device 10, which in this case has a concave shape due to the concave shape of the reflecting surface of the reflector 16. The curved reflector can be formed in accordance with the approach described in U.S. Pat. No. 5,618,474, incorporated herein by reference above.

Figure 2:
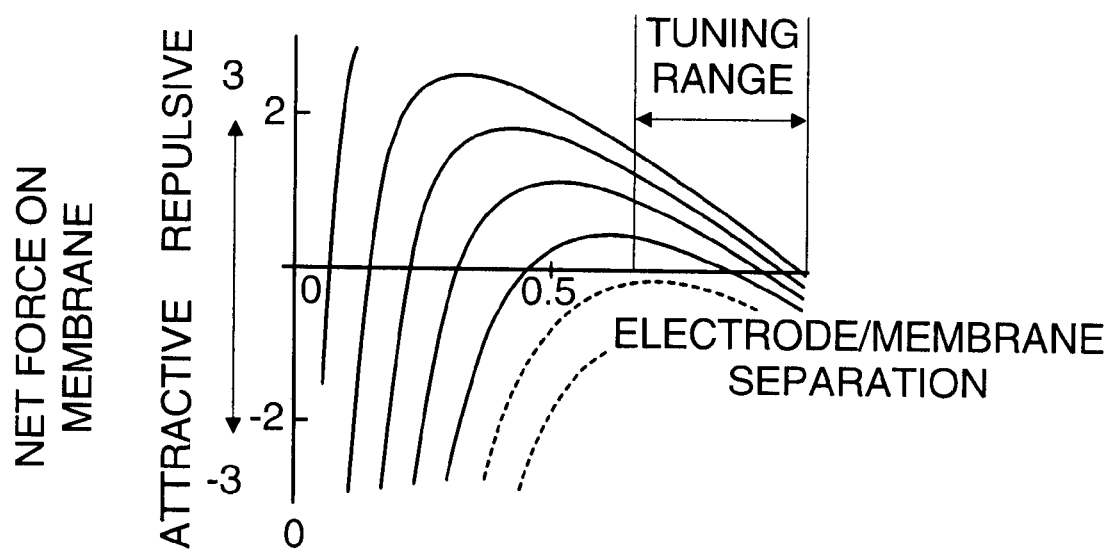
FIG. 2 is a schematic plot illustrating an exemplary relationship of the separation distance between an electrode and a movable membrane versus the net attractive/repulsive electrostatic force on the membrane, for several applied voltages, in accordance with the invention.

The length of the cavity 18 is changed to tune the filter 10 by applying a voltage across the moving membrane reflector electrode 14 and the tuning drive electrode 12 using the adjustable voltage source 22. Upon application of the tuning voltage, an electric field is generated in the electrostatic drive spacing or cavity 20. The electrostatic forces cause the membrane to deflect, thus altering the length of the optical cavity 18 as desired. FIG. 2 is a schematic plot illustrating an exemplary relationship of the separation distance between the electrode 12 and membrane 14 versus the net attractive/repulsive electrostatic force on the membrane 14, for several applied voltages. A tuning range is illustrated in which electrode/membrane contact is avoided.

Figure 3A:
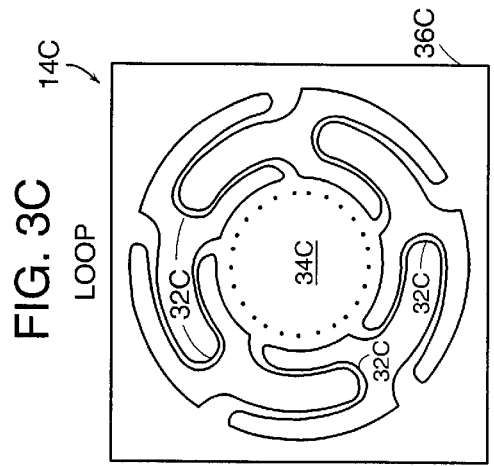
FIGS. 3A through 3G are schematic plan views of various configurations of the movable membrane layer with different tether patterns in accordance with the invention.
Figure 3B:
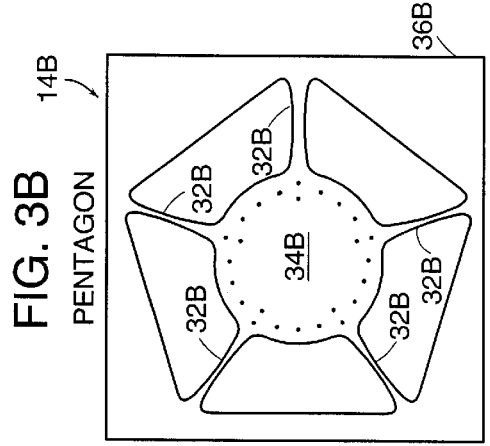
Figure 3C:
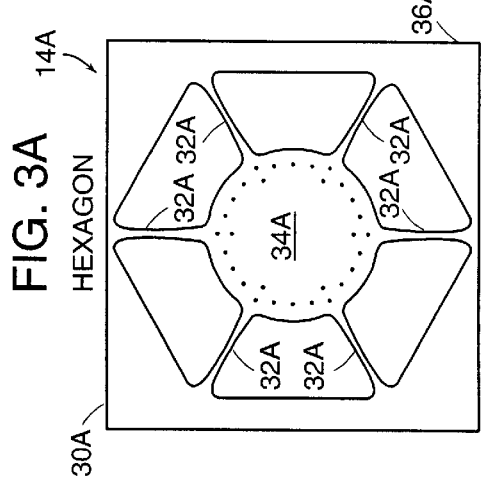
Figure 3E:
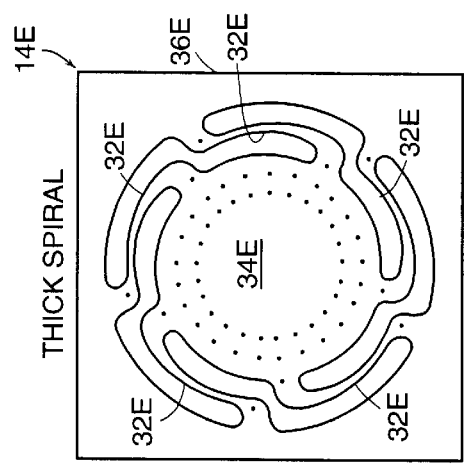
Figure 3D:
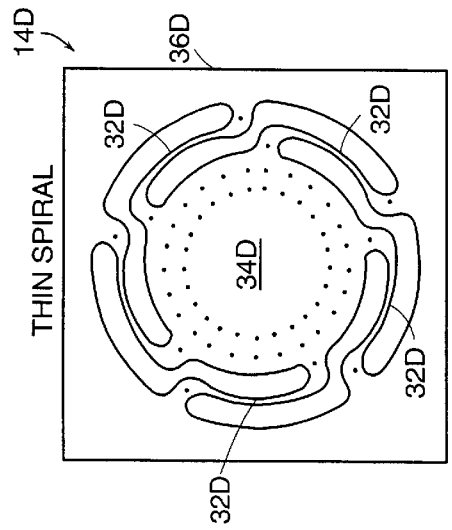
Figure 3F:
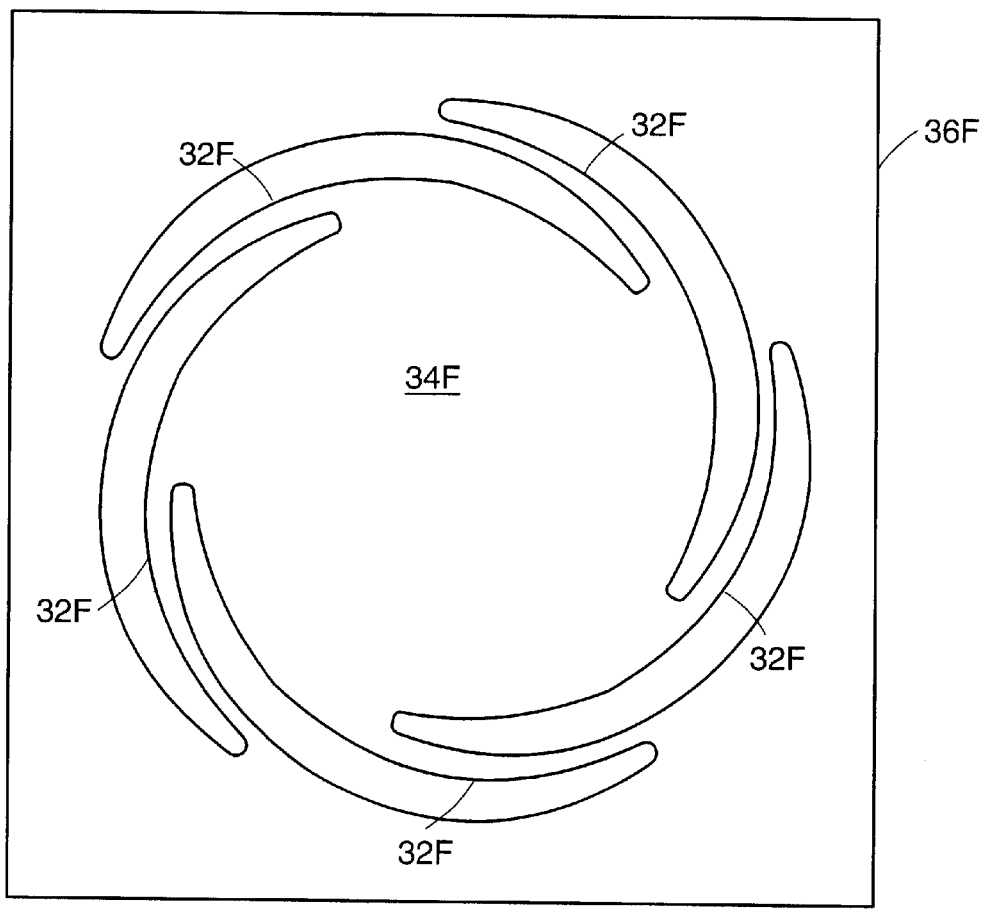
Figure 3G:
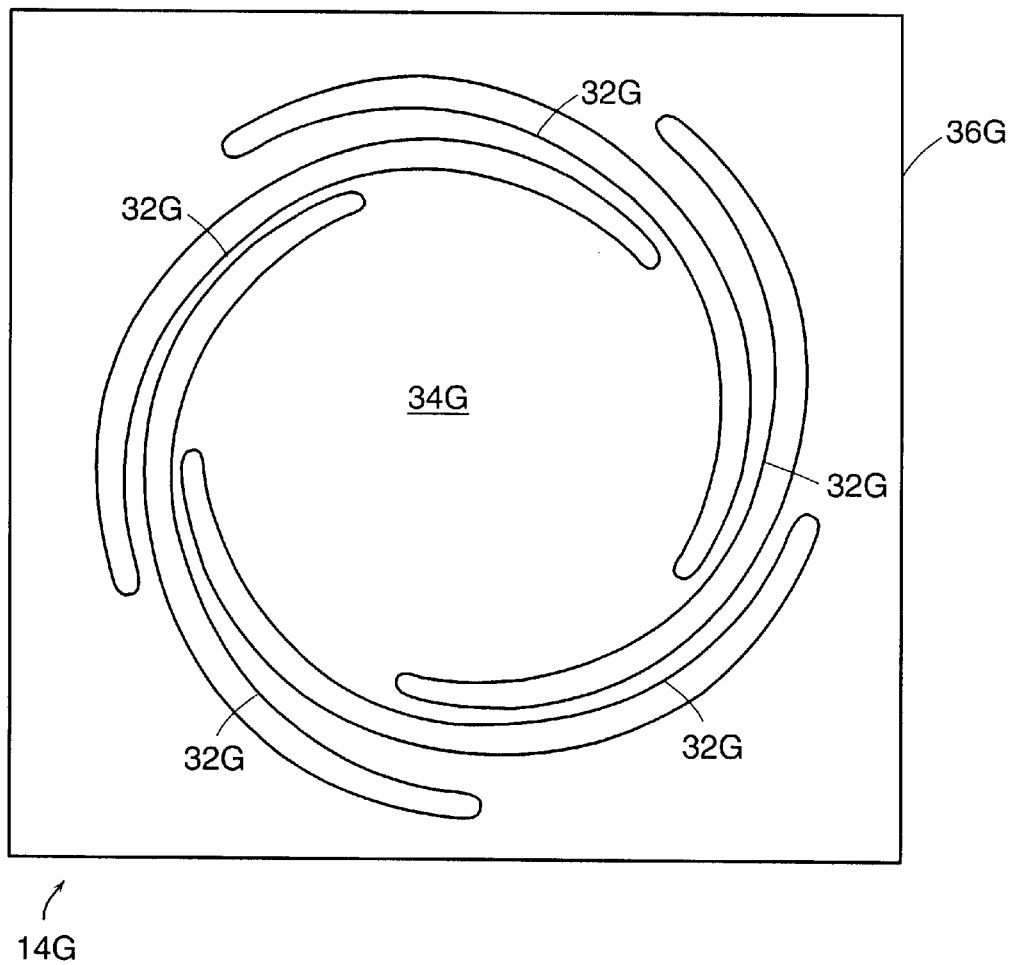

In accordance with the invention, the reflective membrane layer 14 is made to deflect under the applied voltage to change the cavity length and thereby tune the filter 10. FIGS. 3A through 3G are schematic plan views of various configurations of the movable membrane layer 14 in accordance with the invention. As shown in FIGS. 3A through 3G, each membrane layer 14 includes an outer body portion 36 and an inner membrane portion 34. The membrane portion 34 is supported in the outer body portion 36 by a pattern of tethers or flexures 32. In FIGS. 3A though 3G, the layers 14 can be primarily distinguished by their tether patterns. FIG. 3A illustrates a straight or radial tether pattern with six radial tethers 32A. FIG. 3B illustrates a straight or radial tether pattern with five tethers 32B. FIG. 3C illustrates a "loop" tether configuration in which tethers feed or loop back on themselves in the area between the outer body 36C and the movable membrane 34C. FIG. 3D illustrates a dogleg spiral tether pattern, referred to as a "thin" spiral because the tethers 32D are relatively thin. FIG. 3E illustrates a "thick" dogleg spiral pattern with relatively thick tethers 32E. FIG. 3F illustrates a nested spiral pattern in which the tethers 32F can be extended to overlap each other. FIG. 3G illustrates a nested swept tether design in which the tethers 32G are extended to overlap each other. That is, the length of the tethers is such that a radial line extending from the center of the membrane portion 34G could intersect multiple, e.g., two, tethers 32G.

It is noted that in the loop and spiral tether patterns of FIGS. 3C through 3G, longer tethers 32 are realized in the same overall device size. This can help provide desired membrane deflection performance without having to increase the size of the device. For micro-electro-mechanical system (MEMS)-based devices, such as the filter of the present invention, using a deflectable membrane structure, it is desirable to optimize the stiffness of the supporting tethers to meet a given set of performance requirements. By using a spiral tether design, the diameter of the inner membrane portion 34 can be made larger for an equivalent length radial tether (holding the outside diameter fixed). This provides a proportionally larger area over which the electrostatic forces can act, thereby reducing the voltage requirement of the device.

The effective area of the radial tether designs can be increased by adding "paddles" to the central membrane. These are appendages that extend outward from the inner membrane in regions between the tethers. The paddles extending from the central membrane can introduce undesirable vibrational modes to the structure, however. Additional constraints are imposed on the design process by the limitations of available fabrication methods. For example, if a designer is required to decrease the stiffness of the structure while maintaining a constant membrane and tether thickness, there are two options: 1) increase the tether length; or 2) decrease the tether width. It is usually more desirable to increase the tether length since the stiffness of a beam is more sensitive to changes in length. However, for a straight tether geometry, this results in an overall increase in device size, which may violate a performance requirement. While decreasing the width of a tether will reduce its stiffness, the lower limit that can be achieved will be imposed by limitations in the fabrication process. For microfabricated devices, the minimum tether width is determined by minimum resolvable feature size that can be produced using the available photolithography and/or etching processes. As the tether width approaches this minimum, the structural response of the system will become more sensitive to process variations, making it difficult to achieve high yield in manufacturing.

A spiral tether geometry is one in which the tether originates from the central membrane at an angle oblique to the local normal. The tether continues along a trajectory such that it intersects the outer circumference of the device at a similar angle, although the originating and terminating angles need not be equal. This is distinct from a straight tether design in which the tethers originate from the central membrane in a purely radial direction and likewise intersect the outer circumference. In the case of spiral geometries, such as those shown in FIGS. 3D through 3G, by orienting the tethers at an oblique angle, longer tethers are possible for a given overall device size. Thus, a membrane structure with a given spring constant, i.e., stiffness, can be achieved within a smaller overall diameter. Furthermore, with a spiral geometry, the tethers can be nested together, as shown in FIGS. 3F and 3G. That is, the originating point of one tether can occur at an azimuthal angle less than that of the point of termination of the neighboring tether. This can be seen in FIG. 3G proceeding counter-clockwise around the pattern and assuming that tethers 32G originate on the inner membrane portion 34G and terminate on the outer body portion 36G. This feature allows the tether length to be varied over a wider range of values, thus providing greater freedom of design. Since the length can be increased to a larger value, the width of the tether can be maintained at a value well above the resolution of the fabrication process, thus improving the manufacturability of the device.

An additional performance advantage of the spiral tether geometry is that it has reduced response to stresses transferred from the central membrane area, compared to straight tether designs. For the tunable filter of the invention, an HR coating is applied to the central membrane to form a moving mirror. Residual stress in this coating induces curvature in the central membrane. Experimental measurements and finite element analyses have shown that the resulting deflection of spiral tethers is less than that of straight tethers. This improved immunity to residual stress in the high reflectivity coating improves the manufacturing yield of the devices. In accordance with the invention, spiral tether geometries are developed to minimize the induced deflection.

Various processes for fabricating the filter of the invention will now be described in detail. FIGS. 4A through 4I contain schematic cross-sectional views illustrating fabrication of one embodiment of the filter of the invention. In this embodiment, referred to as "Oxide Defined Electrostatic Drive," the assembly starts with a base wafer, Wafer A, which in one embodiment is produced from a standard n-type doped silicon wafer and which serves as the supporting substrate for the entire device. Wafer A is typically 75 mm to 150 mm in diameter and is 400 to 500 microns thick. The wafer A is oxidized to a depth $x_1$, typically 2 to 4 microns and which is specified to achieve the design parameters for the electrostatic tuning drive. The maximum tuning range is approximately 33% of this oxide thickness (see FIG. 2), and the required maximum tuning voltage is inversely proportional to the square of the thickness, as is typical for electrostatic drives.

Figure 4A:
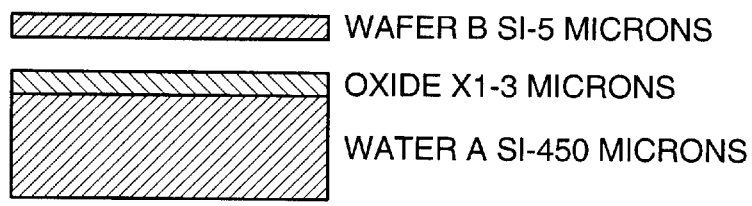
FIGS. 4A through 4I contain schematic cross-sectional views illustrating fabrication of one embodiment of the filter of the invention.
Figure 4B:
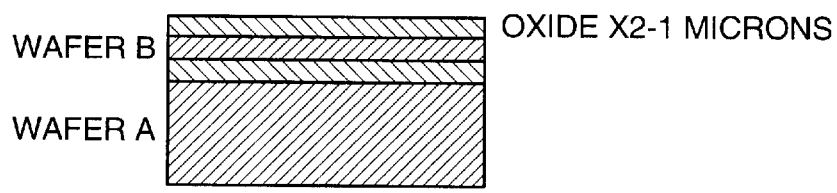
Figure 4C:
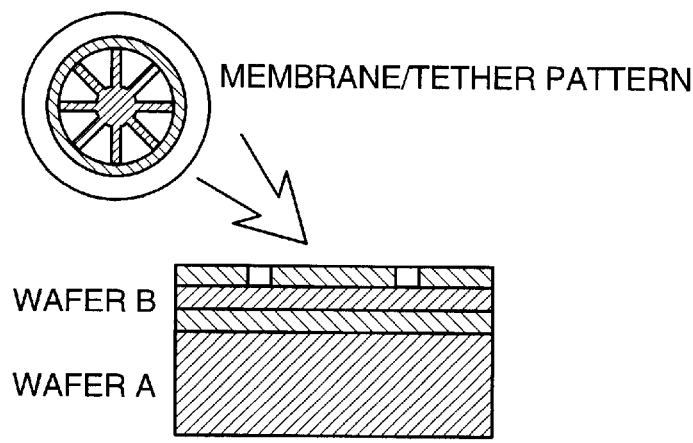

As shown in FIG. 4B, a second n-type doped silicon wafer, Wafer B, is bonded to Wafer A using elevated temperature and mechanical pressure. Wafer B, which will become the electrostatically deflectable silicon membrane, is ground to a thickness $t_1$, typically 6 to 10 microns. After grinding, the surface of Wafer B is oxidized to a thickness $x_2$, typically 0.5 to 1.0 micron. As shown in FIG. 4C, a membrane and tether pattern, such as those shown in FIGS. 3A through 3G, is etched into the oxide grown on Wafer B.

Figure 4D:
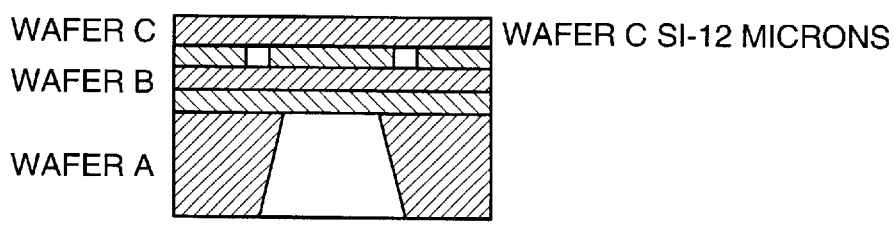

Next, as shown in FIG. 4D, a third n-type doped silicon wafer, Wafer C, is bonded to the oxide on Wafer B, again using elevated temperature and mechanical pressure. This wafer, Wafer C, will become the cavity spacer that defines the optical properties of the FPF. Wafer C buries the membrane-patterned oxide on Wafer B and is subsequently ground to a thickness $t_2$, typically 15 to 25 microns, that is appropriate to the mirror-to-mirror spacing of the curved mirror-flat mirror Fabry-Perot optical cavity. This translates to a free spectral range of 45 to 80 nm.

Figure 4E:
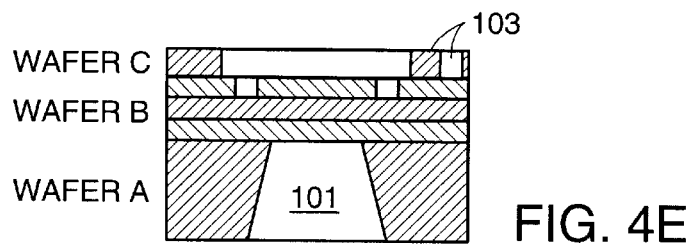
Figure 4F:
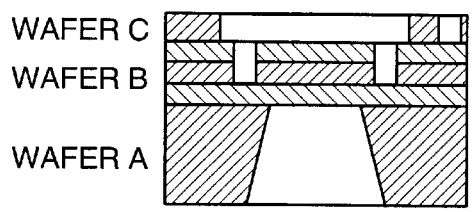

As shown in FIGS. 4D and 4E, an optical port 101 is patterned and etched into Wafer A using a combination of isotropic and anisotropic etching. The oxide layer $x_1$ is used as an etch stop. Alternatively, the optical port etch step can be omitted, as silicon is partially transparent at infrared wavelengths, in which case an anti-reflective (AR) coating is applied to the outer surface of Wafer A to minimize reflection from the air-silicon interface. With the process described, the underside of the membrane and opposing side of the handle wafer will not have AR. Thus, the optical performance of the device could be compromised. A spacer and electrical contact pattern 103 is etched into Wafer C using the oxide of thickness $x_2$ as an etch-stop layer. As shown in FIG. 4F, a silicon etch is performed anisotropically to transfer the diaphragm and tether pattern into the underlying silicon (Wafer B), using the oxide of thickness $x_1$ as an etch stop layer. One approach would be to use directional reactive ion etching for this step.

Figure 4G:
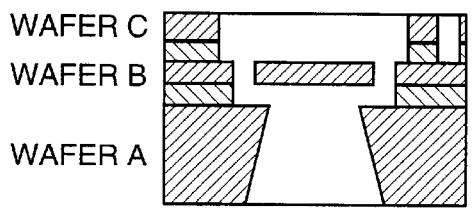

As shown in FIG. 4G, the resulting structure is subjected to an isotropic oxide etchant to "release"0 the membrane and tether structure from the oxide layer $x_1$, and the etch-stop oxide is removed from the openings forming the spacer and contact. In one embodiment, this would call for the use of concentrated HF followed by methanol, followed by a drying step using supercritical carbon dioxide.

Figure 4H:
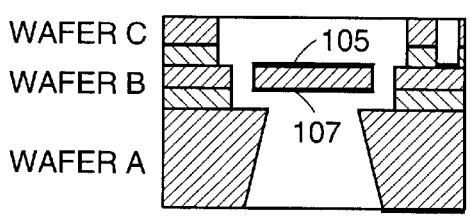

As shown in FIG. 4H, a high reflectivity (HR) multi-layer dielectric mirror 105 is deposited through the spacer opening onto the membrane interior surface using an appropriate shadow mask. An anti-reflection (AR) coating 107 is similarly deposited through the optical port onto the exterior surface of the membrane. Both of these coatings are designed for the wavelength bands of interest.

Figure 4I:
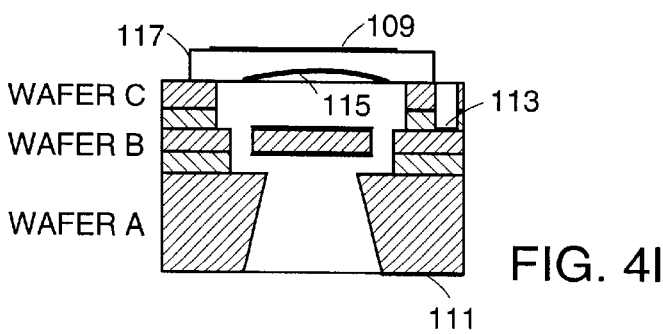

Next, as shown in FIG. 4I, electrical contacts 111 and 113 are deposited on the back side of Wafer A and in the contact opening of Wafer B, respectively, in one embodiment using aluminum or a refractory metal. Next, as shown in FIG. 4I, a concave, highly polished micro-mirror 117 is installed on top of the spacer layer. In one embodiment, the mirror 117 is made in accordance with U.S. Pat. No. 5,618,474, incorporated herein by reference. The mirror 117 has an appropriate HR coating 115 on its interior surface and an appropriate AR coating 109 on its exterior surface, so that it forms a precision, high-finesse optical cavity in conjunction with the diaphragm or membrane. High parallelism and accurate spacing is maintained because of the uniformity of the spacer grinding thickness. The mirror attachment can be performed using gold-tin attachment layers (or Au/AuSn spacers in the alternate implementation without the spacer wafer attached) formed by deposition or plating. If a deposited or plated spacer is used, the metal composition may be graded so that eutectic melting occurs only near the attachment interface to the mirror.

Figure 5A:
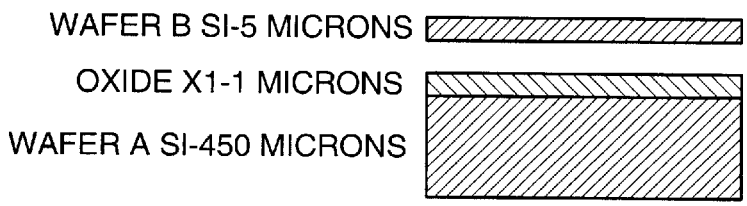
FIGS. 5A through 5G contain schematic cross-sectional views illustrating fabrication of another embodiment of the filter of the invention.
Figure 5B:
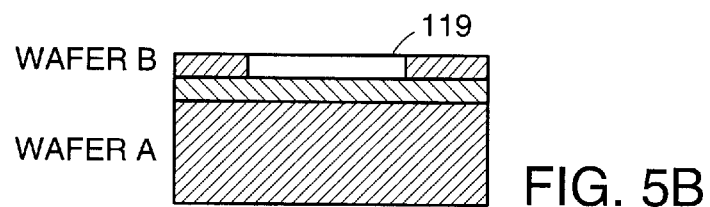

FIGS. 5A through 5G contain schematic cross-sectional views illustrating fabrication of another embodiment of the filter of the invention. In this embodiment, referred to as "Silicon Defined Electrostatic Drive," the wafer assembly again starts with the base wafer, Wafer A, which will become the supporting substrate for the entire device, as shown in FIG. 5A. In one embodiment, Wafer A is 75 mm to 150 mm in diameter and 400 to 500 microns thick. The wafer is oxidized, or receives deposited oxide which is subsequently densified, to a thickness $x_1$, typically 0.5 to 1.0 micron. A second n-type doped silicon wafer, Wafer B, is bonded to Wafer A using elevated temperature and mechanical pressure. Wafer B, which in this embodiment will become the spacer between the membrane and the drive electrode, is ground to a thickness $t_1$, which can be 1 to 3.5 microns. As shown in FIG. 5B, after grinding, Wafer B is patterned and etched to form part of the cavity 119 between the mirror membrane and electrode. During this etch, the oxide layer of thickness $x_1$ is used as an etch stop. Alternatively, the cavity etch can be omitted and performed at a later step.

Figure 5C:
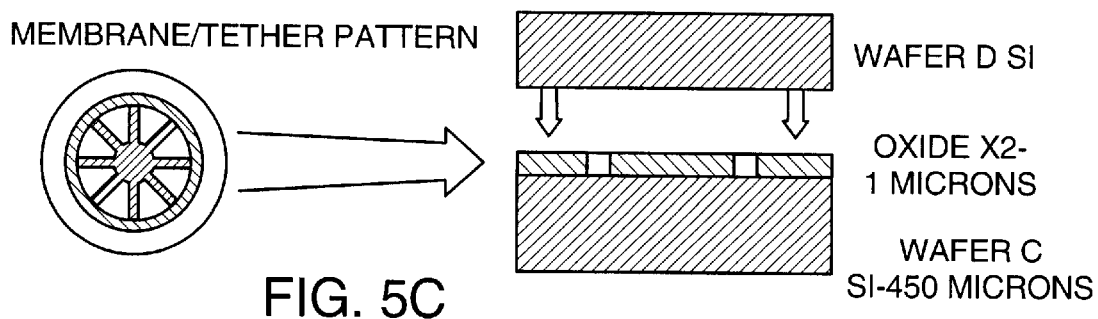
Figure 5D:
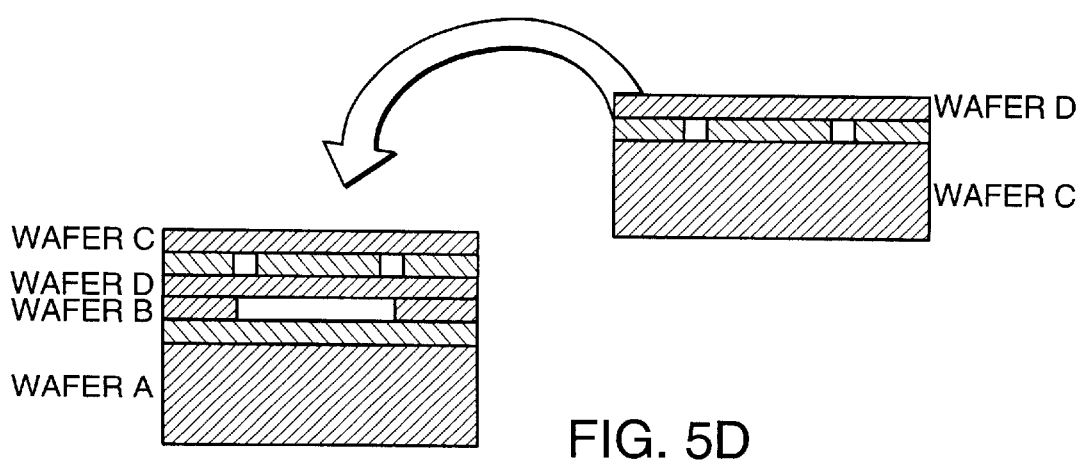

Referring to FIG. 5C, setting aside the A-B structure, a separate, 400–500 microns thick, n-type doped silicon wafer, Wafer C, of the same size as Wafers A and B, is oxidized, or receives deposited oxide which is subsequently densified, to a thickness $x_2$, which can be 0.5 to 1.0 micron. Wafer C is patterned and the oxide thickness $x_2$ is etched to form a deflectable mirror membrane and tether pattern. Another n-type doped silicon wafer, Wafer D, is bonded to Wafer C. Wafer D is ground to a thickness $t_1$ suitable for an electrostatically deflectable silicon membrane thickness, which can be 6 to 10 microns. As shown in FIG. 5D, Wafer C/D assembly is flipped over, and the ground surface of Wafer D is bonded to the oxidized surface of Wafer B using elevated temperature and mechanical pressure. Wafer C is subsequently ground to a thickness $t_2$, which can be 15 to 25 microns, appropriate to the mirror-to-mirror spacing of the curved mirror-flat mirror Fabry-Perot optical cavity.

Figure 5E:
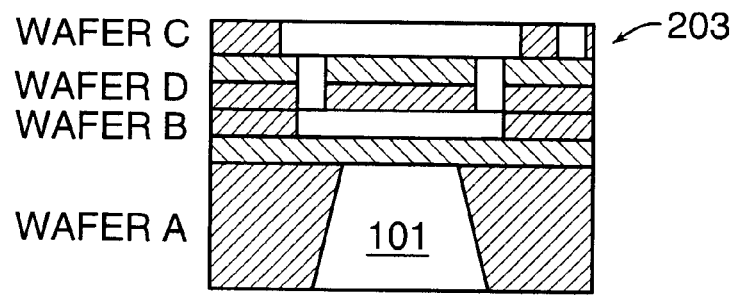

Referring to FIG. 5E, an optical port 101 is patterned and etched into Wafer A, using a combination of isotropic and anisotropic etching. The oxide of thickness $x_1$ is used as an etch stop. If the cavity etch was not performed in an earlier step, the oxide of thickness $x_1$ is removed, and the cavity is formed by isotropic etching. As in the embodiment described above in connection with FIGS. 4A through 4I, the optical port etch step can be omitted. If the optical port is omitted, an anti-reflective (AR) coating is applied to the outer surface of Wafer A to minimize reflection from the air-silicon interface.

Figure 5F:
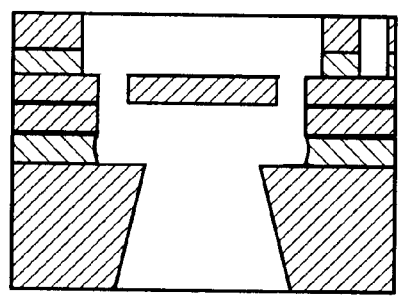

As also shown in FIG. 5E, a spacer and electrical contact pattern is etched into Wafer C, using the oxide $x_2$ as an etch stop layer. This is followed by an anisotropic silicon etch to transfer the diaphragm or membrane and tether pattern from the oxide $x_2$ into the underlying silicon (oxide $x_1$ is the etch stop layer). In one implementation, directional reactive ion etching is used for this step. Next, as shown in FIG. 5F, the etch stop oxides are removed from the openings, releasing the diaphragm and tethers without wet etchant, thus avoiding the static friction ("stiction") caused by liquid surface tension.

The remaining steps are similar to those of the embodiment described above in connection with FIGS. 4A though 4I. A HR mirror layer 105 is deposited through an appropriate shadow mask and the spacer opening onto the membrane surface, and an AR coating 107 is deposited on the optical port side of the membrane. Electrical contacts 111 and 113 are deposited on the surfaces of Wafer A and Wafer D. The contacts 111 and 113 can be made of aluminum or a refractory metal.

Figure 5G:
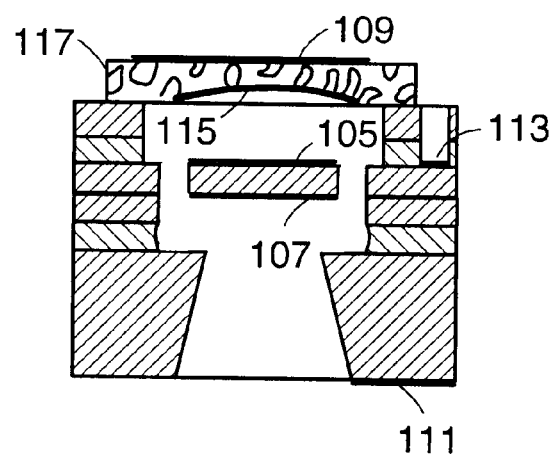

Referring to FIG. 5G, a curved mirror 117 with an HR coating 115 and patterned metallization, e.g., Ti—Au, 0.5 micron thickness, is attached to the spacer layer, establishing a precision gap between the curved mirror surface and the HR coating 105 on the membrane. High parallelism is maintained because of the uniformity of the spacer grinding thickness. The mirror attachment can be performed using AuSn attachment layers (or Au/AuSn) formed by deposition of plating. If a deposited or plated spacer is used, the metal composition may be graded so that eutectic melting occurs only near the attachment interface to the mirror.

FIGS. 6A through 6G contain schematic cross-sectional views illustrating fabrication of another embodiment of the filter of the invention. In this embodiment, referred to as "Plated Airbridge," the assembly starts with a standard n-type doped silicon wafer, Wafer A, which in one embodiment is 75 mm to 150 mm in diameter and 400 to 500 microns thick. In this embodiment, Wafer A is used as the cavity spacer for the Fabry-Perot cavity, a dielectric membrane is the moving mirror, and a plated electrode formed by an "airbridge" technique is the fixed drive electrode.

Figure 6A:
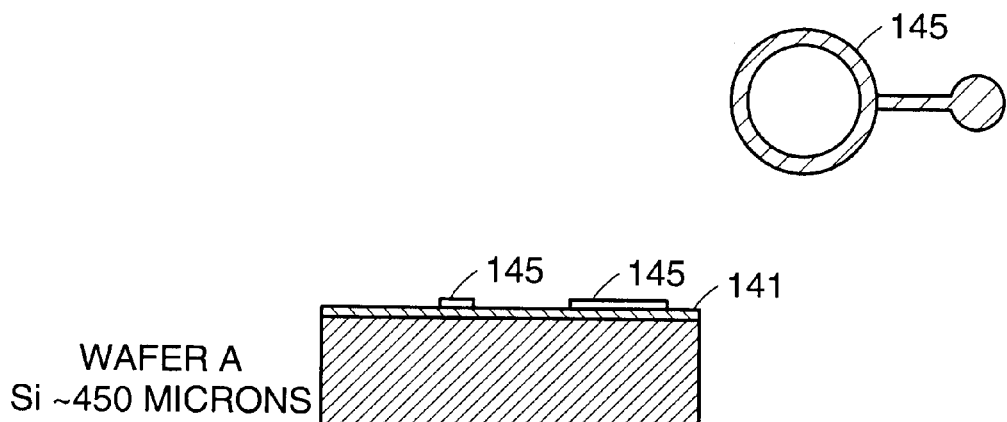
FIGS. 6A through 6F contain schematic cross-sectional views illustrating fabrication of another embodiment of the filter of the invention.

Referring to FIG. 6A, the process starts with application of a HR coating on the top surface of Wafer A, followed by an AR coating, at a thickness of 3 to 9 microns, on the HR coating. This resulting dielectric membrane 141 will become the moving membrane of the filter as described below. In one embodiment, the HR/AR coating 141 includes alternating layers of dielectric material such as $SiO_x$ or $TiO_x$ with the thicknesses and deposition conditions adjusted to leave a net tensile stress in the dielectric film.

The membrane electrode pattern 145 is created next. A resist layer is applied, exposed and patterned using, for example, an image reversal technique, to achieve resist undercut. Next, electrode metal, such as Ti—Pt—Au or Ti—Ni—Au, of total thickness of 0.5 micron is deposited. The metal is then lifted off to leave patterned membrane electrode metal, metal traces and bonding pads. Alternatively, the electrode metal is deposited first, patterned with resist, then etched to form the membrane electrode metal.

Figure 6B:
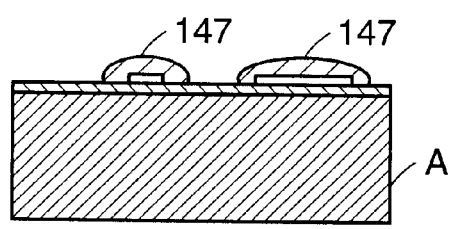

Referring now to FIG. 6B, next, another layer of resist 147, the "airbridge" resist, is applied, exposed and patterned on the surface of the HR/AR coating layer 141 and electrode pattern 145. This resist 147 is used to protect the membrane electrodes and define the gap between the membrane electrodes and the fixed electrodes, which are deposited next. In order to protect the existing membrane electrodes and properly form the fixed electrodes, the patterned resist 147 is reflowed.

Figure 6C:
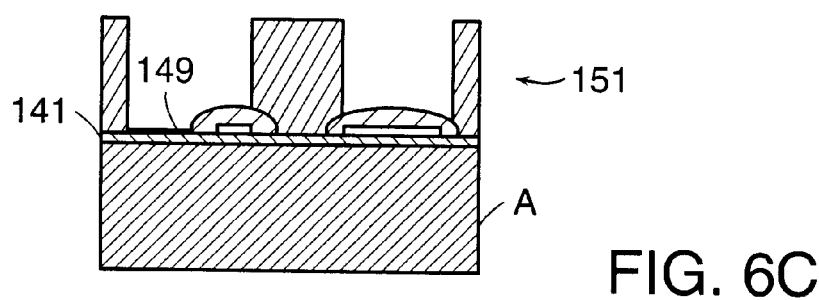
Figure 6D:
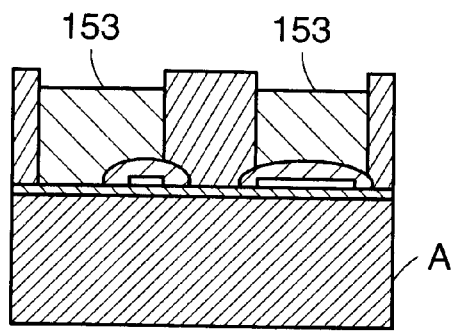

Referring to FIG. 6C, a plating base layer 149, which can be a 0.5 micron thick sputtered Ti—Au layer, is deposited over the patterned resist and in the resist openings. Next, a thick layer of resist or PMMA 151 is deposited on or mechanically attached to the plating base layer 149. In one embodiment, the thickness of this resist or PMMA 151 is 20 to 600 microns. The thick resist or PMMA 151 is exposed with UV, DUV or soft X-rays (for example, synchrotron-generated X-rays, as in the LIGA technique) then developed to form the plating pattern. Next, referring to FIG. 6D, attaching one electrode to the plating base layer, the wafer is electroplated with Au, Ni, NiFe or other suitable plating metal 153. Plating thickness can be as much as the plating resist or PMMA thickness. In one embodiment, the plating thickness is 20 to 600 microns. This plated layer 153 forms airbridge electrodes facing the membrane electrodes, an optical port and an integral mounting structure.

Figure 6E:
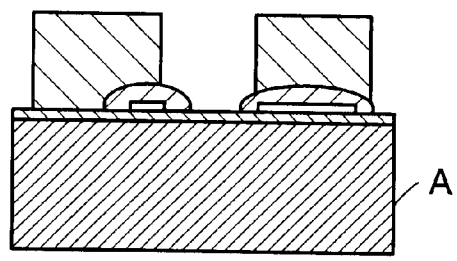

Referring to FIG. 6E, next, the thick resist or PMMA is removed, followed by removal of the unplated, sputtered plating base layer 149, using ion milling or Au etchant. The exposed airbridge resist is removed using isotropic dry etching with heating in a fluorinated oxygen plasma.

In one implementation, the plated integral mounting structure is designed to attach to a surface perpendicular to the optical cavity axis using AuSn solder.

Figure 6F:
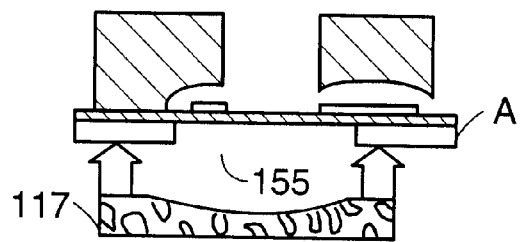

Referring to FIG. 6F, using the plated structure for support, Wafer A is ground to a thickness $t_2$, which in one embodiment is 15 to 25 microns, appropriate to the mirror-to-mirror spacing of the curved mirror-flat mirror Fabry-Perot cavity. A spacer opening 155 is patterned and etched into Wafer A, using a combination of isotropic and anisotropic etching. The HR/AR layer 141 is used as an etch stop. The HR/AR layer 141 is released at this point, such that it now simultaneously performs mechanical and optical functions. The mechanical function is the support of the deflectable membrane over the spacer opening, and the optical function is the HR/AR capabilities.

Referring to FIG. 6F, the curved mirror 117 is then attached as in the previous embodiments.

In the embodiments of the invention described thus far, the length of the optical cavity, i.e., the spacing between the curved reflector and the membrane, is controlled by the thickness of a silicon and/or an oxide layer. FIGS. 7A through 7G contain schematic cross-sectional views illustrating fabrication of another embodiment of the filter of the invention, in which the spacing and, therefore, the length of the optical cavity can be more precisely controlled by the thickness of one or more metal layers which are plated or bonded to either the surface of the layer in which the membrane is formed or the surface of the curved mirror structure.

Figure 7A:
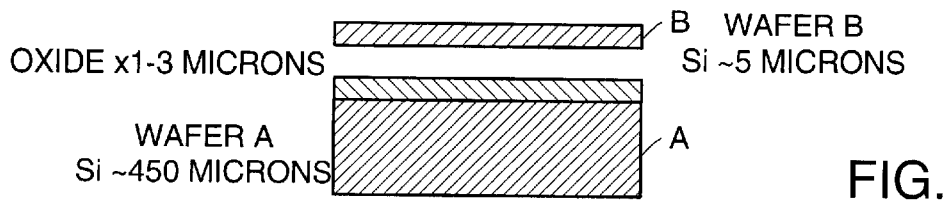
FIGS. 7A through 7G contain schematic cross-sectional views illustrating fabrication of another embodiment of the filter of the invention.
Figure 7B:
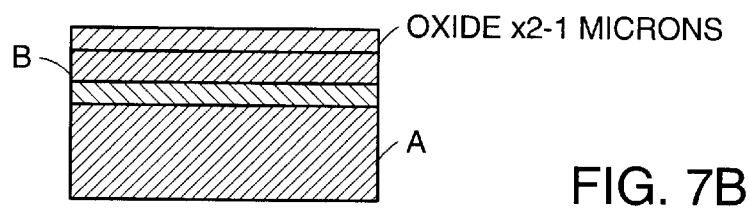
Figure 7C:
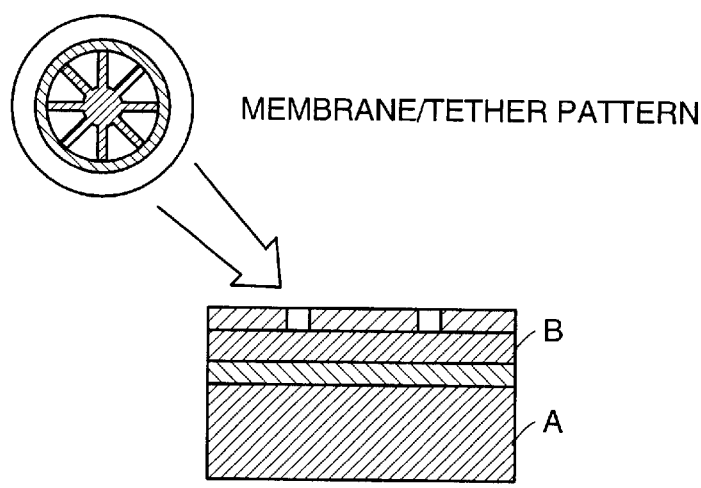
Figure 7D:
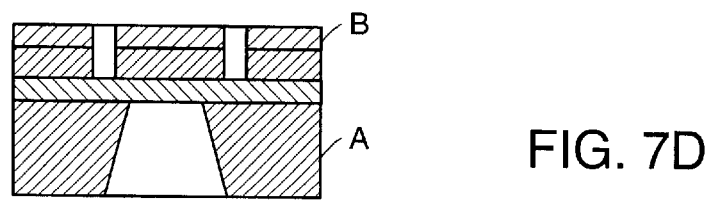
Figure 7E:
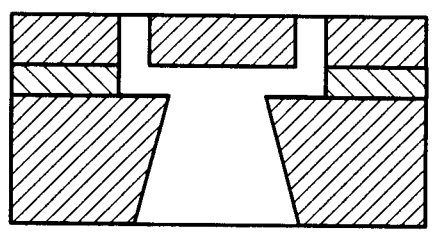
Figure 7F:
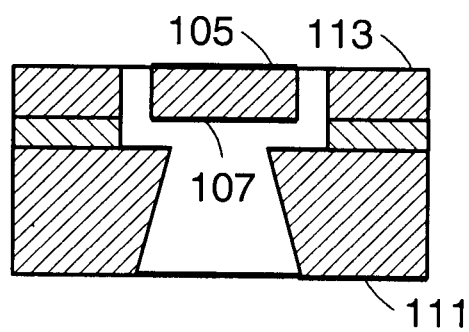
Figure 7G:
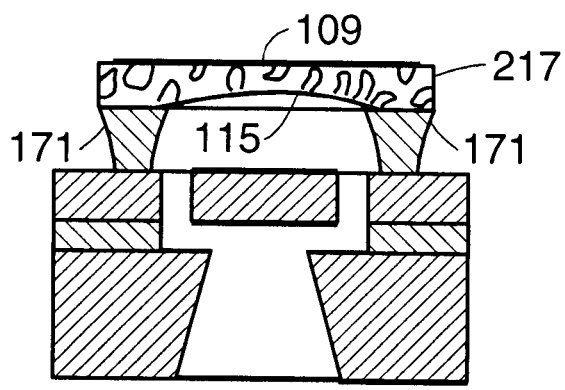

Referring to FIGS. 7A through 7G, it is noted that the steps illustrated in FIGS. 7A through 7C are the same as those illustrated and described above in connection with FIGS. 4A through 4C. Therefore, description of them will be omitted. In FIG. 7D, Wafer B is etched to form the membrane and tether pattern in the wafer. In FIG. 7E, the remaining oxides on top of Wafer B are etched away isotropically. In FIG. 7F, the HR coating 105 and AR coating 107 are applied to the membrane and the electrodes 111 and 113 are applied to Wafer A and Wafer B, respectively, as in the previous embodiments. In FIG. 7G, the mirror assembly 217 is mounted on the top of Wafer B. Spacing posts 171 are interposed between the top of Wafer B and the mirror assembly 217 to control the cavity length between the mirrors.

Figure 8A:
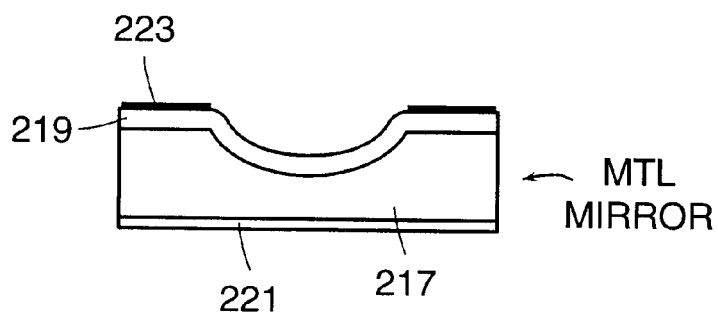
FIGS. 8A through 8C contain schematic cross-sectional views illustrating an approach to forming spacing posts for defining the length of the optical cavity in the filter according to the present invention.
Figure 8B:
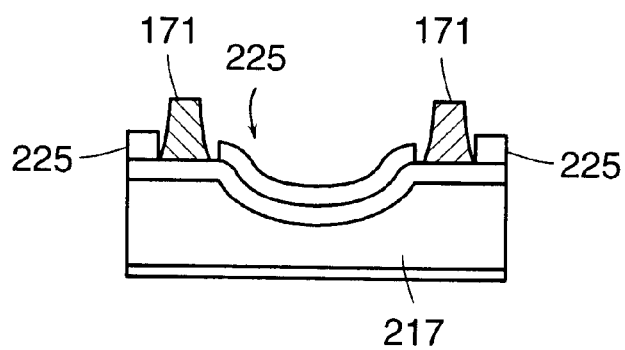
Figure 8C:
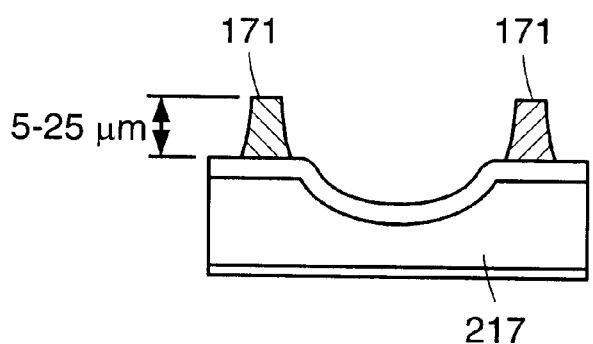

FIGS. 8A through 8C contain schematic cross-sectional views illustrating an approach to forming the spacing posts 171 illustrated in FIG. 7G. In FIG. 8A, the mirror assembly 217 includes an AR coating 221 on its bottom and sides and a HR coating 219 on its top surfaces as shown. A metal seed layer 223 is sputtered onto the edges of the curved portion of the mirror surface as shown.

Next, in FIG. 8B, a layer of photoresist 225 is applied and patterned to define the location and size of the spacing posts 171. The metal spacers 171 are then formed by plating the exposed seed layer with a metal such as gold. The metal is plated to a thickness suitable for the cavity length of the device. In one embodiment, the thickness is 5 to 25 microns. Referring to FIG. 8C, the photoresist is removed, leaving the mirror assembly 217 with the spacing posts 171.

Figure 9A:
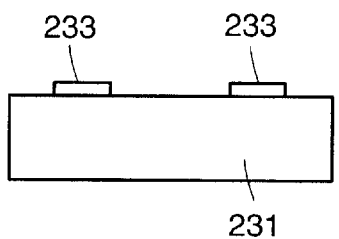
FIGS. 9A through 9D contain schematic cross-sectional views illustrating another approach to forming spacing posts for defining the length of the optical cavity in the filter according to the present invention.

FIGS. 9A through 9D contain schematic cross-sectional views illustrating another approach to forming the spacing posts 171 illustrated in FIG. 7G. As shown in FIG. 9A, a sacrificial bonding layer made of, for example, titanium, copper and/or tungsten, is formed on a surrogate substrate 231 and patterned, leaving pads 233 on which the spacing posts 171 will be formed.

Figure 9B:
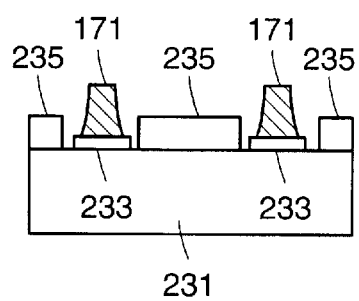
Figure 9C:
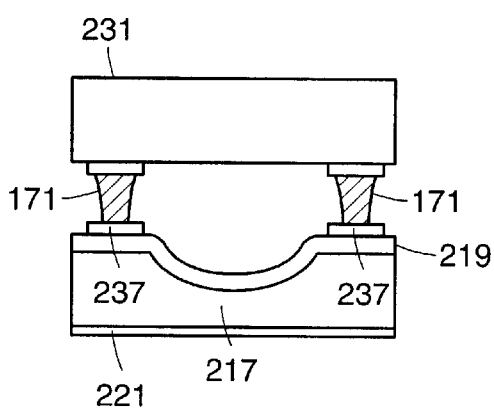
Figure 9D:
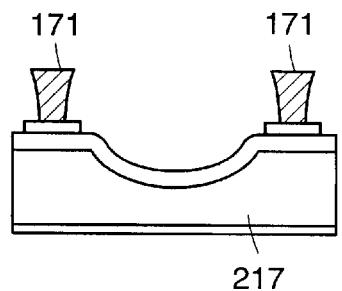

Next, as shown in FIG. 9B, a photoresist pattern 235 is deposited and patterned as shown to define the location and size of the spacing posts. The posts are then formed by plating metal such as gold onto the pads 233 to a thickness appropriate for the desired cavity length. In one embodiment, the posts 171 are plated to a height of 15 to 25 microns. Next, as shown in FIG. 9C, the substrate 231 with the posts 171 is flipped, and the posts 171 are bonded to bonding metal pads 237 made of, for example, gold, formed on the mirror assembly 217. Next, as shown in FIG. 9D, the surrogate substrate 231 and plating seed pads 233 are removed, leaving the tops of the spacing posts 171 ready for bonding to the remainder of the device, as described above.

It should be noted that any of the bonding steps described herein can be performed by a thermo-compression bonding process. Under that process, the surfaces being bonded together are formed with a multiple conductor structure which includes a titanium adhesion layer formed on the surface of the device to be bonded. A platinum diffusion barrier layer is formed over the adhesion layer, and the gold bonding layer is formed over the barrier layer. The two structures are then attached at their bonding layers, and the composite device is subjected to elevated temperature, e.g., 320 degrees C., and pressure, e.g., 200 psi, for a predetermined period of time, which in one embodiment is approximately three minutes. The high pressure and heat cause the structures to bond together.

It is also noted that when the tuning voltage is applied to the electrodes of the invention, it is possible that the membrane may deflect sufficiently to make contact with other device surfaces. For example, referring to FIG. 4I, it is possible for the bottom side of the membrane formed in Wafer B to make contact with the top surface of Wafer A across the electrostatic cavity. After the surfaces touch, it can be difficult to separate them, even after the voltage is removed, due to static friction or stiction between the two surfaces. To solve this problem, in one embodiment of the invention, one or both of the surfaces can be roughened to reduce the amount of surface area in contact. In one embodiment, the roughening is performed by an etching and/or polishing process to the original wafer or wafers before assembly. For example, the top surface of Wafer A can be subjected to the roughening process, such as by plasma etching or buffered HF. In one embodiment, roughening to 5 to 20 nm is used. Alternatively, fluorocarbon films are applied to one or both surfaces.

Figure 10:
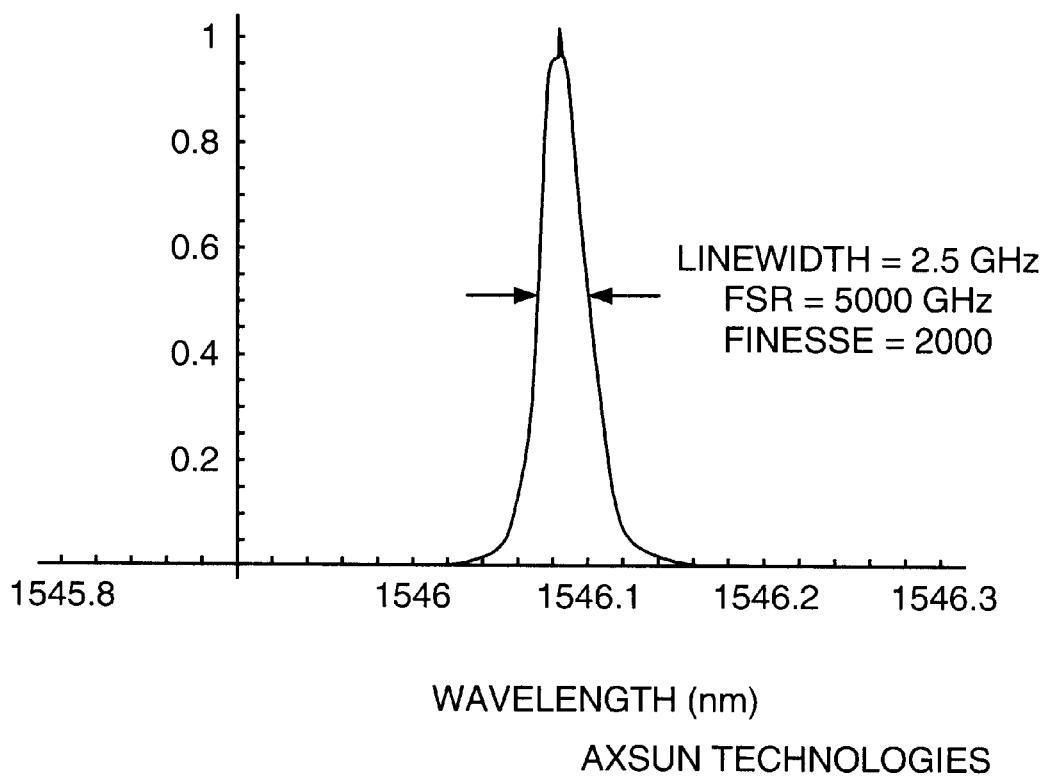
FIG. 10 contains a schematic plot of wavelength versus gain illustrating the performance of one embodiment of the improved tunable FPF of the invention.

FIG. 10 contains a schematic plot of wavelength versus gain illustrating the performance of one embodiment of the improved tunable FPF of the invention. The plot illustrates the peak wavelength in the passband of the filter. The peak is relatively narrow in wavelength compared to the peaks obtained by FPFs tunable in accordance with conventional methods.

Figure 11A:
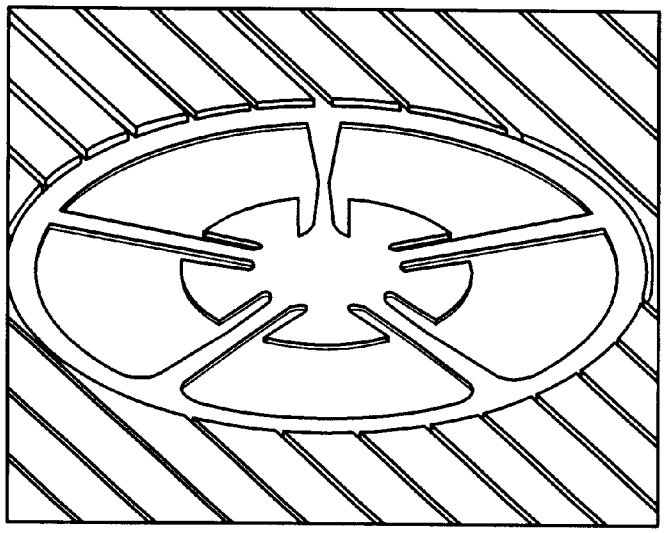
FIGS. 11A through 11C contain perspective pictorial images of three types of tether and membrane configurations in accordance with the present invention.
Figure 11B:
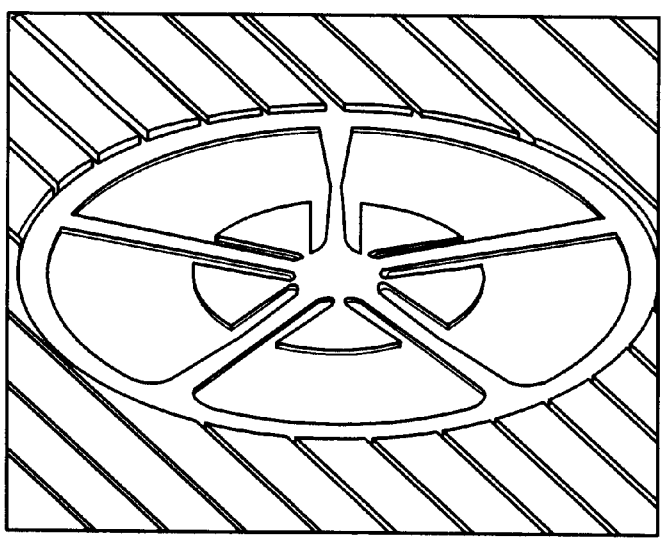
Figure 11C:
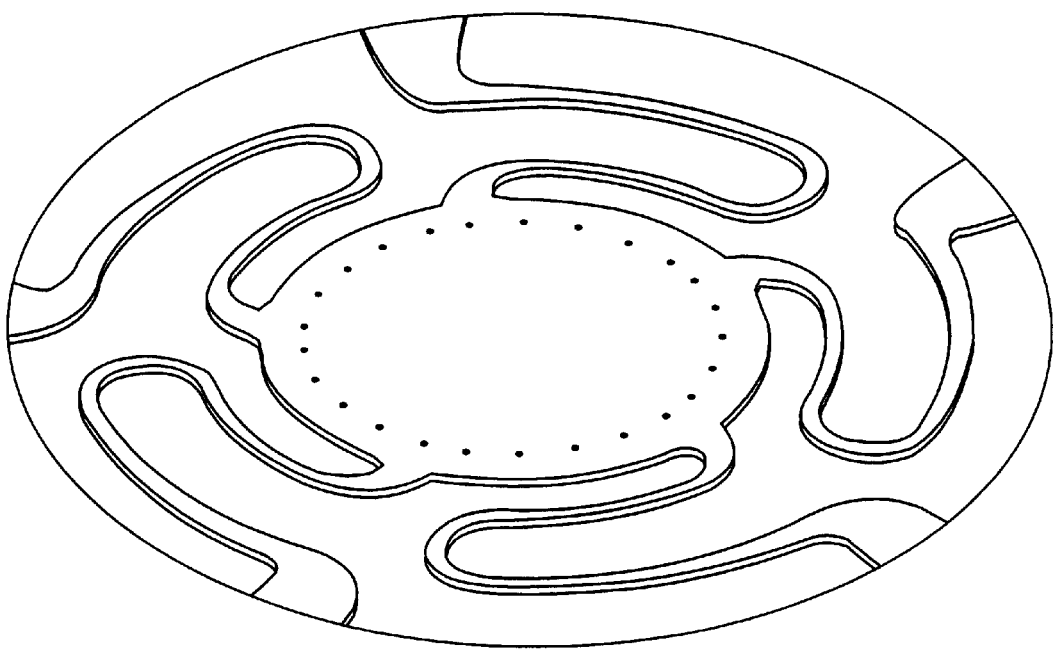

FIGS. 11A through 11C contain perspective pictorial images of three types of tether and membrane configurations in accordance with the present invention. FIGS. 11A and 11B illustrate two radial or straight tether configurations. FIG. 11C illustrates the loop configuration depicted in plan view in FIG. 3C.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A tunable optical filter comprising:
   a first mirror structure comprising a suspended high reflectivity coating layer that functions as a deflectable membrane layer;
   a metal electrode that has been deposited on the high reflectivity coating layer;
   a second, concave mirror structure;
   a spacer layer separating the first mirror structure and the second mirror structure, the first mirror structure and the second mirror structure defining a resonant optical cavity of the optical filter; and an electrostatic cavity across which electric fields are generated to control a separation between the first mirror structure and the second mirror structure to thereby change a length of the optical cavity.

2. A tunable filter as claimed in claim 1, wherein the first mirror structure is substantially flat.

3. A tunable filter as claimed in claim 1, wherein a membrane is formed in the membrane layer that is patterned with an outer portion and tethers extending from the outward portion inward to the membrane.

4. A tunable filter as claimed in claim 1, wherein the resonant optical cavity is between 15 and 25 micrometers long.

5. A tunable optical filter comprising:

a support substrate;

a membrane layer comprising a membrane structure, on which a first mirror has been deposited;

a release layer between the membrane layer and the support substrate;

a mirror structure that supports a second mirror that defines a filter cavity in combination with the first mirror wherein at least one of the first mirror and the second mirror is curved.

6. A tunable filter as claimed in claim 5, further comprising a spacer that separates the mirror structure from the membrane layer.

7. A tunable filter as claimed in claim 5, wherein the membrane layer is manufactured from silicon wafer material.

8. A tunable filter as claimed in claim 5, wherein the release layer is silicon oxide.

9. A tunable filter as claimed in claim 5, wherein the release layer defines an electrostatic cavity between the membrane structure and the support substrate.

10. A tunable filter as claimed in claim 5, wherein the filter cavity is between 15 and 25 micrometers long.

11. A tunable filter as claimed in claim 5, further comprising an optical port through the support substrate to the membrane layer.

12. A tunable filter as claimed in claim 5, further comprising an antireflective coating on the membrane layer opposite the first mirror.

13. A tunable filter as claimed in claim 5, wherein the mirror structure is bonded to the membrane layer via an intervening spacer with solder.

14. A tunable filter as claimed in claim 5, wherein the mirror structure is bonded to the membrane layer via intervening silicon spacer.

15. A tunable filter as claimed in claim 5, further comprising a metal spacer that separates the mirror structure from the membrane layer.

16. A tunable filter as claimed in claim 5, further comprising a silicon wafer material spacer that separates the mirror structure from the membrane layer.

17. A method for fabricating a tunable filter, the method comprising:

selectively removing part of a release layer on a support substrate to create a membrane structure in a membrane layer;

connecting a mirror structure to the membrane layer;

depositing highly reflective coatings on the membrane layer and the mirror structure to provide an optical cavity bounded by a curved mirror and by a flat mirror; and etching an optical port through the support substrate to the membrane layer.

18. A method as claimed in claim 17, further comprising patterning the membrane layer to comprise an outer portion and tethers extending from the outward portion inward to a center optical membrane portion.

19. A method as claimed in claim 17, further comprising forming an electrostatic cavity having one end defined by the membrane layer.

20. A method as claimed in claim 17, further comprising forming an electrostatic cavity across a void formed during the step of selectively removing the release layer.

21. A method as claimed in claim 17, further comprising forming an electrostatic cavity by covering the membrane layer with a sacrificial layer and then forming a patterned conductive material structure on the sacrificial layer, and then removing the sacrificial layer to create an air bridge cavity.

22. A method as claimed in claim 17, wherein the step of depositing the highly reflective coatings comprises depositing dielectric mirror coatings.

23. A method as claimed in claim 17, further comprising coating a back-side of the membrane structure with an antireflective coating.

24. A method for fabricating a tunable filter, the method comprising:

selectively removing part of a release layer to create a membrane structure in a membrane layer;

forming a mirror structure with a concave surface;

connecting the mirror structure to the membrane layer;

depositing highly reflective coatings on the membrane layer and the mirror structure to provide an optical cavity bounded by a curved mirror and by a flat mirror.

25. A method for fabricating a tunable filter, the method comprising:

selectively removing part of a release layer to create a membrane structure in a membrane layer;

connecting a mirror structure to the membrane layer;

depositing highly reflective coatings on the membrane layer and the mirror structure to provide an optical cavity bounded by a curved mirror and by a flat mirror; and locating a spacer between the mirror structure and the membrane layer that is sized such that the optical cavity between the highly reflective coatings on the membrane layer and the mirror structure is between 15 and 25 micrometers long.

26. A method for fabricating a tunable filter, the method comprising:

selectively removing part of a release layer to create a membrane structure in a membrane layer, wherein the membrane layer is manufactured from silicon wafer material;

connecting a mirror structure to the membrane layer;

depositing highly reflective coatings on the membrane layer and the mirror structure to provide an optical cavity bounded by a curved mirror and by a flat mirror.

27. A method as claimed in claim 26, wherein the release layer is silicon oxide.

28. A method for fabricating a tunable filter, the method comprising:

selectively removing part of a release layer to create a membrane structure in a membrane layer;

connecting a mirror structure to the membrane layer;

depositing highly reflective coatings on the membrane layer and the mirror structure to provide an optical cavity bounded by a curved mirror and by a flat mirror;

bonding the mirror structure to the membrane layer via an intervening spacer with solder.

* * * * *